March 13, 1956     H. MARTIN     2,738,452
DRY MULTI-PELLET RECTIFIERS
Filed June 13, 1951     3 Sheets-Sheet 1
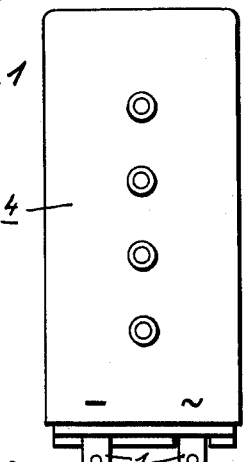
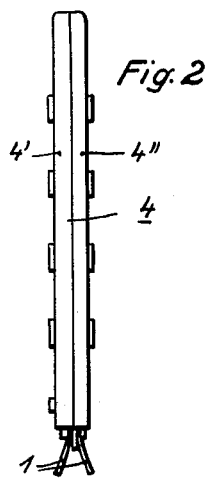
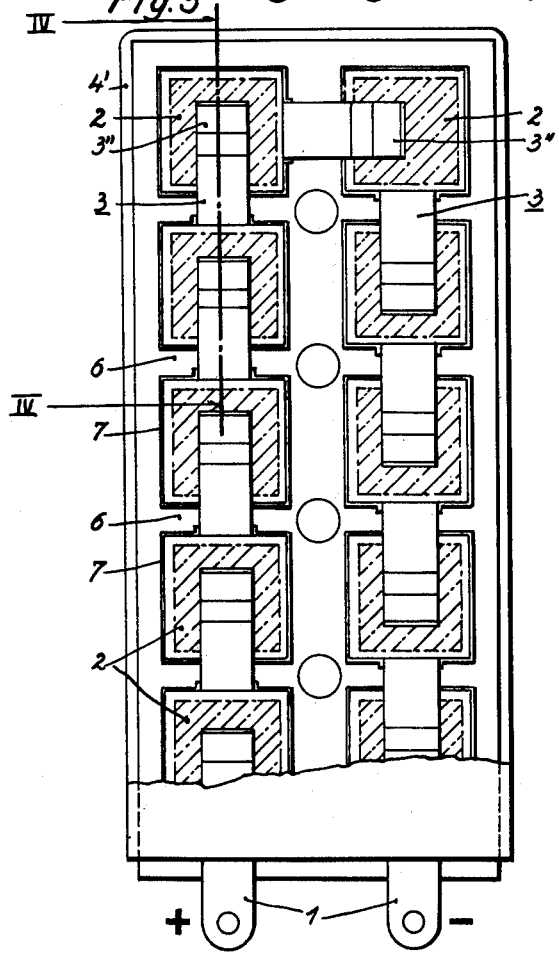
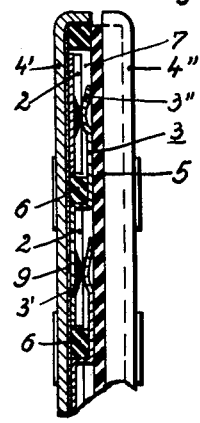
Inventor:
HEINZ MARTIN
BY C. M. Avery ATT'Y March 13, 1956     H. MARTIN     2,738,452

DRY MULTI-PELLET RECTIFIERS

Filed June 13, 1951     3 Sheets-Sheet 2

Inventor:
HEINZ MARTIN

March 13, 1956 — H. MARTIN — 2,738,452
DRY MULTI-PELLET RECTIFIERS
Filed June 13, 1951 — 3 Sheets-Sheet 3
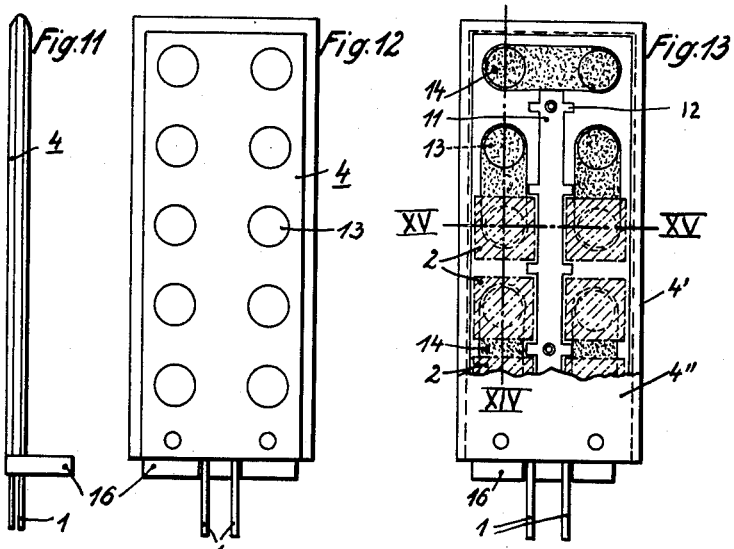
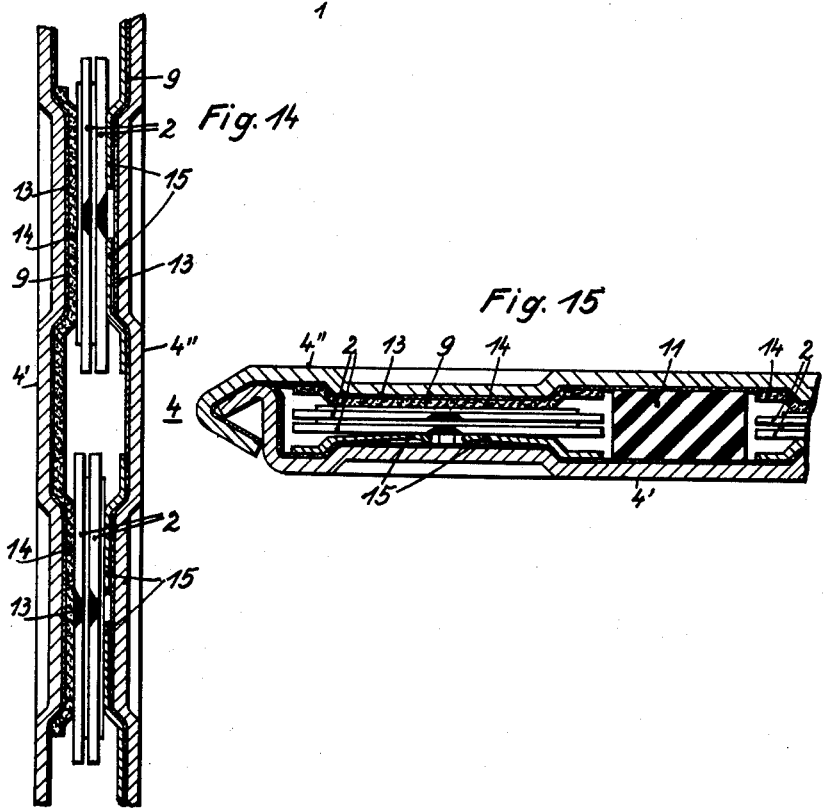
Inventor:
HEINZ MARTIN
BY C. M. Avery ATT'Y United States Patent Office 2,738,452
Patented Mar. 13, 1956

2,738,452

DRY MULTI-PELLET RECTIFIERS

Heinz Martin, Berlin-Neukolln, Germany, assignor to Siemens-Schuckertwerke Aktiengesellschaft, Berlin-Siemensstadt, Germany, a corporation of Germany Application June 13, 1951, Serial No. 231,360

Claims priority, application Germany June 30, 1950

9 Claims. (Cl. 317—234)

My invention relates to barrier-layer rectifiers, usually called "dry rectifiers," and particularly to multipellet rectifier devices of small overall dimensions.

In known devices of this type the pellets, forming the rectifying barrier-layer units proper, are stacked to a column. A protective insulating enclosure of the column is sufficient for devices of low current-carrying duty, for instance, for measuring or modulating purposes. For higher duties, however, such as required of line-current rectifiers for energizing radio sets, amplifiers or similar apparatus, the disposal of waste heat from such a small rectifier device poses quite a problem. To improve the heat dissipation, it has become known to enclose the rectifying pellet column in a cylindrical housing of metal with an interior insulating coating for electrical insulation from the column.

In other known multi-pellet rectifier devices, the pellets are arranged flat in a common plane and are mounted upon a supporting insulating body and electrically interconnected by overlapping contact strips. While such devices have a flat over-all shape of favorably small height, their current-carrying capacity is also limited by poor heat dissipation.

It is an object of my invention to improve multi-pellet rectifier devices toward a more favorable disposal of waste heat; and it is also an object to achieve this improvement with rectifier parts of simple design easily manufactured and assembled.

To this end, and in accordance with my invention, several rectifier pellets to be assembled to a multi-pellet device are placed beside one another in a common plane and electrically interconnected by pellet-overlapping contact parts, one or more such pellets being provided in the direction perpendicular to that plane; and this assembly of pellets is narrowly enclosed and structurally braced by a flat protective or cooling jacket. Such a device affords an especially effective elimination of waste heat. This is mainly due to the fact that the broad sides of the rectifier pellets lie face-to-face with the broadsides of the jacket wall, thus securing a good heat transfer from the pellets to the jacket. The individual components of the device, furthermore, can easily be manufactured and the entire multi-pellet device involves only simple assembling work.

The foregoing and other objects, features and advantages are apparent from the embodiments of the invention exemplified by the drawing and described in the following. In the drawing:

Figs. 1 and 2 are front and side views, respectively, of a first embodiment. Fig. 3 is a sectional view of the same device on a larger scale, and Fig. 4 is cross section through part of the device along the plane indicated at IV—IV in Fig. 3.

Figs. 5 and 6 are front and side views, respectively, of a second embodiment, and Figs. 7 and 8 show the same device in respective sectional views corresponding to those of Figs. 3 and 4.

Figs. 11 and 12 are a side view and a front view, respectively, of a third embodiment shown sectionally in Fig. 13, while Figs. 14 and 15 are partial cross sections through the same device, shown on a larger scale, along the sectional planes indicated in Fig. 13 at XIV—XIV and XV—XV respectively.

Corresponding parts of the various embodiments are denoted by the same respective reference numerals.

Figure 5:
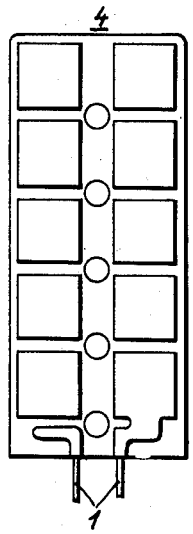
Figure 6:
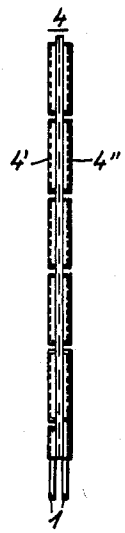
Figure 7:
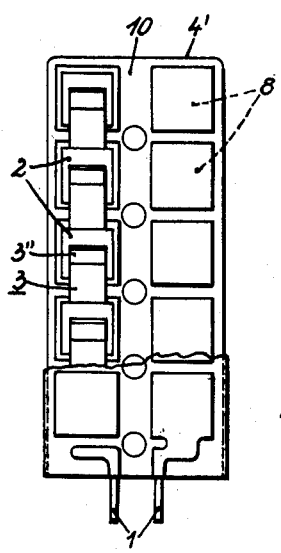
Figure 8:
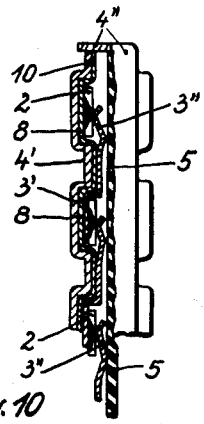

A rectifier device according to the invention has the shape of a flat box, as apparent from Figs. 1, 2 or 5, 6 or 11, 12. The electric terminals 1 of the device are located at one of the narrow sides of the box structure. To obtain the flat design of the device, the individual rectifier pellets 2 are so arranged that several pellets lie beside each other in a common plane as is apparent from Figs. 3, 4 or 7, 8 or 13 to 15. The pellets are of a flat shape and shown to be square although pellets of different shapes may also be used. Each pellet consists of a barrier-layer cell or unit of any known and suitable composition such as a copper oxide, selenium or germanium unit.

The pellets are interconnected by overlapping contact parts 3 so that all pellets within a common plane are series connected with one another between the terminals 1 of the device. The arrangement may either be such that only one plane group of rectifier pellets is provided, or the device may include a plurality of pellet groups disposed in respective parallel layers so that two or more pellets are located in the direction perpendicular to the plane of pellet arrangement. Suitable mans described in the following serve to secure the individual pellets in the desired position. A protective cooling jacket 4 encloses the pellet arrangement and determines the above-mentioned flat exterior shape of the entire device. The jacket consists of metal and, as shown in all embodiments, may be composed of two flat half shells 4', 4" whose respective hollows face each other. The two shells of each jacket are firmly connected with each other, for instance, by rivets or by marginal overlap joints.

Each of the two embodiments of Figs. 1 to 8 has two layers of rectifier pellets 2, an insulating plate 5 being disposed between the two layers. In the embodiment of Figs. 1 to 4 the pellets 2 of each layer are secured against displacement within their common plane by means of another insulating plate 6 with window openings 7 traversed by the respective pellets 2. In the embodiment of Figs. 5 to 8 the jacket 4 of the device is directly utilized for positioning the rectifier pellets. To this end, the broadside walls of the shells 4' and 4" of the metal jacket are provided with pan shaped depressions or embossments 8, the rectifier pellets 2 being located in the respective depressions.

Figures 9, 10:
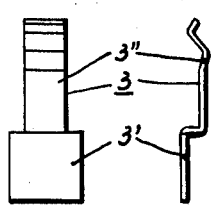
Fig. 9 is a front view and Fig. 10 is a side view of one of the contact parts of the device according to Figs. 1 to 4 and 5 to 8.

In both embodiments of Figs. 1 to 8 each of the contact parts 3 for electrically interconnecting two adjacent rectifier pellets engages the front side of the one pellet and the rear side of the other pellet. This design of the contact parts is apparent from Figs. 9 and 10. Each contact part has a flat portion 3' and a bent resilient tongue 3". The contact parts are mounted in the device so that the flat portion 3 is located at the jacket side of a rectifier pellet, while the tongue 3" engages the opposite side of the next pellet. In this manner, an especially effective heat transfer from the rectifier pellets to the jacket is secured since each rectifier pellet is in face-to-face contact at one of its broadsides with the plate-shaped flat portion 3' of the contact part which, in turn, lies face-to-face with the jacket wall. The contact parts 3 in the rectifier devices according to the first two embodiments establish a series connection of all pellets within one of the two pellet layers. The two pellet layers are also series connected with each other, a parallel connection of the two layers being also applicable if desired.

The interior surface of the metal jacket 4 has an insulating coating 9 to electrically separate the jacket from the pellets. To secure a good heat transfer from the pellet engaging contact parts 3 to the metal body of the jacket 4, the insulating coating 9 is preferably very thin or made of a material of especially good heat conductance. Such a coating may consist of a suitable varnish. If the body of the jacket consists of aluminum, the good heat conductive coating may consist of a layer of aluminum oxide deposited or formed upon the aluminum jacket. The insulating coating may also consist of a suitable foil such as shown at 10 in Fig. 8, consisting, for instance, of triacetate.

In the third embodiment of Figs. 11 to 15, each two rectifier pellets are placed directly upon each other perpendicularly to the pellet plane so that a direct passage of current occurs between these two pellets (Figs. 14, 15). For positioning the pellets within the jacket 4, an insulating bridge insert 11 is provided. The insert has lateral projections 12 between each two adjacent pellets to keep them properly spaced. The rectifier pellets 2 rest upon inwardly projecting embossments 13 of the jacket shells. The contact parts for electrically series connecting the rectifier pellets are preferably disposed alternately at the inner side of the one jacket shell and at the inner side of the other shell. As illustrated, the contact parts 14, according to a feature of the invention, consist of respective metalized areas on the insulated coating 9 at the inside of the jacket. These metalized areas 14 are best apparent from Fig. 13. Each metalized area interconnects two neighboring embossments 13 on which the respective rectifier pellets are located. The provision of metalized or sprayed contact means of this kind has the advantage of greatly simplifying the assembly work required in the manufacture of the rectifier, due to the elimination of the otherwise necessary additional assembly elements. Such metalized parts or areas may be disposed on both shells of the jacket. According to another feature of the invention, however, such metalized parts are provided at only one of the two jacket shells. Thus, only the shell 4' according to Figs. 14 and 15 is equipped with metalized contact parts 14. To secure the necessary pellet connections at the other jacket shell 4', inserted leaf spring strips 15 are provided preferably at places where they act upon the two pellets placed upon each other. These additional resilient contact elements afford an especially reliable contact pressure at the rectifier pellets. According to Figs. 11 to 15, the flat-shaped rectifier device is equipped with an insulating base 16 at its narrow terminal side to permit mounting the rectifier device on a panel or other carrier structure.

Various modifications of the invention other than those specifically described will be apparent to those skilled in the art upon a study of this disclosure and may be applied without departure from the essential features of my invention and within the scope of the claims annexed hereto.

I claim:

1. A multi-pellet dry rectifier device, comprising a plurality of adjacent pellet layers, each layer having a number of rectifier pellets arranged flat in a common plane, substantially flat contact parts overlapping each two adjacent pellets of the same layer in face-to-face contact and electrically interconnecting said two pellets, and a heat conductive jacket of flat shape enclosing said pellets and said parts and having its broadsides parallel to said layer planes and disposed in an electrically-insulating heat-conductive relation to the respective adjacent pellet layers.

2. A multi-pellet dry rectifier device, comprising a plurality of parallel and mutually adjacent pellet layers each having a number of rectifier pellets arranged flat in a common plane and electrically interconnected with each other, a metal jacket of flat shape enclosing said pellet layers and having its broadsides parallel and in proximity thereto, said jacket being electrically insulated from said layers and heat conductively joined therewith, a plurality of insulating structures, one for each of said layers, each of said structures extending parallel to said plane and abutting against the narrow sides of said jacket, and each of said structures having holes in which said pellets of the pertaining layers are located, and an insulating partition parallel to said broadsides and disposed between said insulating structures.

3. A multi-pellet dry rectifier device, comprising a number of flat rectifier pellets arranged beside each other in a common plane, contact parts each overlapping two adjacent pellets in face-to-face contact therewith, each of said contact parts having a portion curved and elastically deformable in a direction transverse to said plane, a metal jacket of flat shape electrically insulated from said pellets and having its broadsides extending parallel to said plane, said jacket being subdivided parallel to said plane into two portions, and said portions being fastened to each other and holding said parts elastically deformed under contact pressure upon said pellets.

4. A multi-pellet dry rectifier device, comprising a number of flat rectifier pellets arranged beside each other in a common plane, contact parts each overlapping two adjacent pellets and being in face-to-face contact with said two pellets at respectively opposite broadsides thereof, a metal jacket of flat shape having its broadsides parallel to said plane, said jacket being insulated from said pellets and parts and enclosing said pellets and parts in heat-conductive relation thereto, each of said contact parts having a flat portion and a bent and resilient tongue portion, said flat portion contacting one of said two pellets at its jacket side and extending between said one pellet and the adjacent broadside of said jacket in face-to-face relation to said broadside, said tongue portion engaging the oppositely directed side of the other pellet, and said jacket being subdivided parallel to said plane into two portions, said jacket portions being attached to each other and holding said parts in position under resilient deflection of said tongue portions.

5. A multi-pellet dry rectifier device, comprising a number of electrically interconnected rectifier pellet members arranged side by side in a common plane, a metal jacket of flat shape enclosing said pellet members and having its broadsides extending parallel to said plane, an intermediate electric insulation disposed in heat-conducting contact with said pellet members and said jacket, an insulating plate loosely inserted into said jacket and extending across said jacket in parallel relation to said plane and having respective openings, said pellets being disposed in said openings and held in position by said insulating plate.

6. A multi-pellet dry rectifier device, comprising a number of electrically interconnected rectifier pellet members arranged side by side in a common plane, a metal jacket of flat shape enclosing said pellet members and having its broadsides extending parallel to said plane, and an intermediate electric insulation disposed in heat-conducting contact with said pellet members and said jacket, said jacket comprising two shells having respective hollows facing each other, each shell having depressions entered into by said respective pellet members for holding said pellet members in position.

7. A multi-pellet dry rectifier device, comprising a number of electrically interconnected rectifier pellet members arranged side by side in a common plane, a metal jacket of flat shape enclosing said pellet members and having its broadsides extending parallel to said plane, an intermediate electric insulation disposed in heat-conducting contact with said pellet members and said jacket, said jacket comprising two shells having respective hollows facing each other, each shell having inwardly projecting embossments, said pellets being positioned on said respective embossments, and spacer insert means disposed between adjacent embossments for securing said pellets in position.

8. A multi-pellet dry rectifier device, comprising a number of electrically interconnected rectifier pellet members arranged side by side in a common plane, a metal jacket of flat shape enclosing said pellet members and having its broadsides extending parallel to said plane, an intermediate electric insulation disposed in heat-conducting contact with said pellet members and said jacket, said jacket being composed of two shells each having an insulating coating on its inner surface, and said contact parts comprising metallized layers on the coating of one of said shells and elastically deformable contact members disposed on the coating of said other shell.

9. A multi-pellet dry rectifier device, comprising a number of electrically interconnected thin flat rectifier pellet members arranged side-by-side in a common plane, an aluminum jacket of flat shape enclosing said pellet members and having its broadsides extruding parallel to said plane so that said broadsides and the flat surfaces of said pellets are juxtaposed, and a thin intermediate layer of electric insulation consisting of aluminum oxide disposed in heat-conducting contact with the flat surfaces of said pellet members and said jacket, said insulation layer comprising an aluminum oxide coating on said aluminum jacket, whereby substantially the entire surface of each pellet is disposed in intimate heat-conducting relation to said jacket.

References Cited in the file of this patent

UNITED STATES PATENTS

| | | |
|---|---|---|
| 2,215,667 | Sherman | Sept. 24, 1940 |
| 2,428,537 | Veszi et al. | Oct. 7, 1947 |
| 2,486,110 | Bugel et al. | Oct. 25, 1949 |
| 2,498,890 | Kotterman | Feb. 28, 1950 |
| 2,510,588 | Kotterman | June 6, 1950 |
| 2,545,863 | Sell et al. | Mar. 20, 1951 |